Sept. 25, 1956
J. S. WEISSBERG
2,764,617
PROCESS FOR CONTROLLING THE VISCOSITY
OF ALKYL PHENOL SULFIDES
Filed Feb. 12, 1953
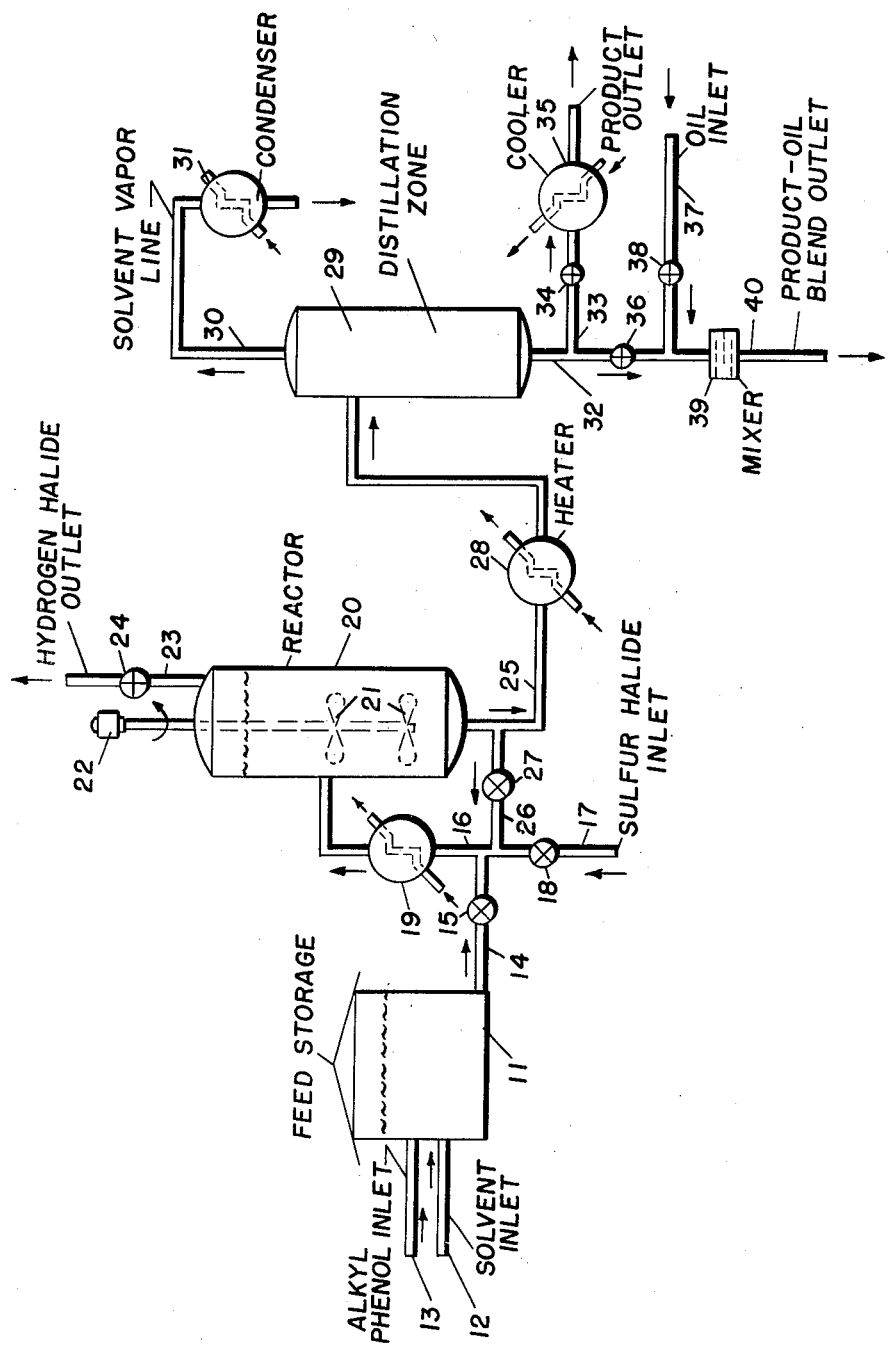
JESSE S. WEISSBERG INVENTOR
BY *Edwin M. Thomas* ATTORNEY United States Patent Office 2,764,617
Patented Sept. 25, 1956

2,764,617

PROCESS FOR CONTROLLING THE VISCOSITY OF ALKYL PHENOL SULFIDES

Jesse S. Weissberg, Elizabeth, N. J., assignor to Esso Research and Engineering Company, a corporation of Delaware Application February 12, 1953, Serial No. 336,466

5 Claims. (Cl. 260—609)

This invention relates to an improved process for producing alkyl phenol sulfides. It particularly relates to a method for controlling the viscosity of alkyl phenol sulfides that have been prepared in an inert volatile solvent and from which the solvent must be removed.

Alkyl phenol sulfides are conventionally produced by treating an alkyl phenol with sulfur halide in the presence of an inert, volatile solvent at a temperature of about 30° C. The reaction is exothermic, and hydrogen halide vapor is evolved. The resulting product consists chiefly of phenolic rings linked through one or more sulfur atoms. The solvent is then removed from the product by batch distilling and heat soaking the mixture at elevated temperatures such as above about 130° C. The total phenol sulfide contact times during the stripping and heat soaking operations have ordinarily ranged as high as 1 to 2 hours or more in order to insure substantially complete removal of the solvent.

The solvent-free product may then be used as an additive material for lubricants and the like. Usually, however, it is blended with a lubricant base stock and plasticizer and then neutralized with a basic metal reagent to form metal alkyl phenol sulfides. These compounds are useful as lubricant detergent additives.

One of the major difficulties encountered in this process is that of handling the viscous solvent-free phenol sulfide. The material normally has viscosities above 1000, S. S. U. at 210° F. usually about 2000 to 4000 or higher. It is consequently difficult to pump in process equipment and must be blended with large amounts of lubricant base solvent or the like to facilitate handling. It also foams excessively during neutralization; plasticizers such as the higher alcohols are usually added to minimize this. The metal salts also have high viscosities and pumping, storage and blending of these materials are aggravated.

It has been assumed heretofore that the reaction conditions during the sulfurization step, such as time, temperature, reactants ratios, etc., were the principal factors determining product viscosity. Carefully controlled reaction variable studies failed to conform this assumption completely. Although reaction conditions are important considerations, it has been discovered that the conditions under which the volatile solvent is separated from the phenol sulfide also play an important role in the matter of product viscosity.

Specifically, it has been found that alkyl phenol sulfide viscosity increases substantially as contact time is increased during the solvent removal step. For example viscosities have been observed to increase by as much as 50 to 100% and even more by heating at a constant temperature for one to three hours. Furthermore, increasing the temperature level during the solvent removal step also causes an increase in viscosity. The reasons for these phenomena cannot be entirely explained at this time, but it is believed that the phenol sulfide undergoes a species of polymerization or condensation reaction during the solvent removal step. It is a principal object of the present invention to provide a means for minimizing the difficulties discussed above.

In accordance with this invention, the tendency of the alkyl phenol sulfide to increase in viscosity during the solvent removal step is minimized by maintaining the solvent volatilization temperature below about 130° C., preferably below 115° C., and keeping the total phenol sulfide contact time below about 15 minutes, preferably below 10 minutes. This procedure usually maintains viscosity increases to below about 25%. Consequently the solvent-free phenol sulfide is easily handled and treated in plant equipment and does not require as much viscosity reduction by auxiliary heavy solvents as conventionally produced materials.

The process will be explained in more detail in conjunction with the sole figure which illustrates a preferred embodiment thereof. Referring to the figure, the numeral 11 denotes a feed storage tank to which is supplied a volatile solvent through line 12 and alkyl phenol through line 13. The mixture of phenol and solvent is charged via line 14 containing control valve 15 into line 16 wherein it is admixed with sulfur halide passing through line 17 containing control valve 18. The sulfur halide may also be admixed in a suitable solvent such as that used for the alkyl phenol.

The reactant mixture is then passed through heat exchanger 19 wherein its temperature may be adjusted and is then passed into reactor 20. This reactor may be provided with a jacket for cooling purposes and including a mixing or agitating means such as propellers 21 motivated by prime mover 22. The reactor is also provided with an outlet line 23 containing control valve 24 for removing hydrogen halide vapors formed during the reaction.

Product is continuously withdrawn from the reaction zone through line 25. A portion of the withdrawn product may be recycled if desired through branch line 26 containing valve 27, from which it is discharged into the sulfur halide inlet stream for recycling to the reaction zone. The product stream withdrawn from the reaction system is heated up to the approximate temperature level required for solvent removal purposes by passage through heat exchanger 28. It is then charged into a suitable distillation zone 29. Zone 29 may be of a conventional type provided with bubble cap trays or other contacting devices for effecting removal of product and solvent. In general it need not be an extremely efficient fractionating zone because of the wide variance between the boiling points of the volatile solvent and the product. Zone 29 is preferably of the continuous type in order to avoid prolonged soaking times at elevated temperature.

Vaporous solvent is removed from the zone through vapor line 30 and is passed through condenser 31. The liquid solvent may then be charged to feed storage tank 11 through solvent inlet 12. Alkyl phenol sulfide product substantially free of solvent is removed through line 32. If it is to be used as such as an additive for mineral oils or for some other purpose, it may be withdrawn from the system through branch line 33 containing control valve 34, cooled to substantially atmospheric temperature in cooler 35, and then passed to storage for subsequent use.

In the event the alkyl phenol sulfide is to be neutralized to form a metal salt useful as a detergent additive, it is generally desirable to blend a mineral oil with the product prior to the neutralization reaction. This may be done by closing valve 34 and opening valve 36 in line 32, charging the requisite amount of oil through inlet line 37 containing valve 38, passing the ingredients through mixing device 39, and then withdrawing the thoroughly mixed materials through outlet line 40. The product-oil blend withdrawn through this line may then be passed to storage or may be charged directly to equipment used for neutralization of the phenol sulfide. In order to avoid prolonged contact times at elevated temperatures, it may be desirable to use the blend oil as a quenching medium whereby it will reduce the temperature of the distillation zone effluent to desired low levels. It is not necessary to reduce the phenol sulfide temperature provided the neutralization is carried out almost immediately after the distillation step.

The solvent removal operation has been shown in connection with a plate-type distillation column, but this step may be carried out equally effectively by any of various solvent volatilization means such as packed towers, tubular heat exchangers, stripping towers using inert gases, steam, and other stripping media, or other types of such systems known in the art. For example, a tubular exchanger may be used for flash evaporation of the solvent, followed by adding solvent oil to the disengaging drum effluent. In the case of stripping operations, steam or inert gas may be passed through the solvent-product mixture and removed with solvent from the top of the tower, while the solvent-free material is removed from the bottom.

As heretofore mentioned, the temperature of the material should be maintained below about 130° C., preferably below about 115° C., during the solvent removal step. Since time of contact at these elevated temperatures is also a critical factor, the solvent removal step should be conducted in equipment that will permit rapid separation and substantially no heat soaking at the elevated temperatures. In the event complete solvent removal is difficult at these temperature levels at atmospheric pressure, the separation step may be carried out at partial vacuum. Batch distillation operations are generally undesirable because it is difficult to obtain complete solvent removal during the short time period that is essential in forming a product of relatively low viscosity.

The reaction conditions and ratios of reactants employed in making the alkyl phenols are conventional to the art. The sulfur halides, such as sulfur mono-chloride and sulfur di-chloride, are supplied in proportions of about 1.25 to 1.75 mols to 2 mols of phenolic material, and the temperature of the reaction is kept well below the boiling temperature of the solvent, preferably below about 50° C. Contact times in the reaction zone are relatively short since the reaction is almost instantaneous.

Various types of phenolic materials may be used in forming the phenolic sulfides. Particularly suitable for forming oil soluble products are phenols having at least one alkyl group having in the range of about 4 to 20 carbon atoms. Specific phenols include the amyl, octyl and dodecyl phenols. Mixtures of alkyl phenols may be used. The use of such materials is well known in the art and need not be described in greater detail herein.

Solvents suitable for use in the reaction include many of the well known organic solvents, preferably those boiling below about 100° C. Such solvents include the halogenated hydrocarbon solvents, such as alkyl halides, ethylene dichloride, chloroform, carbon tetrachloride and the like. Solvent naphthas are particularly suitable. The paraffinic types, such as a mixture of hexanes, are particularly preferred. Various aromatic solvents such as benzene, toluene and xylenes may be used since they are substantially inert under the reaction conditions. The amount of solvent employed in the reaction is not particularly critical, its chief purpose being to improve contact between the phenolic material and sulfur halide. Therefore sufficient solvent should be used to form a fluid easily handled mixture that may be readily contacted in the reaction zone.

The following specific examples will serve to illustrate the improvements realized in the practice of the present invention:

Product A was prepared by a conventional batch commercial operation in which tert.-octyl phenol was treated with sulfur dichloride ($SCl_2$). The phenol was first dissolved in an equal volume of a mixture of hexanes (initial boiling point of about 68° C.), and sulfur dichloride was added to the stirred solution and contacted for a period of about 2 to 3 hours at a temperature of about 30° C. The mol ratio of $SCl_2$ to tert.-octyl phenol was about 1.5:2.0. Hydrogen chloride was removed from the reactants. After the reaction was completed, the reactants were distilled up to a temperature of about 130° C. in order to remove the hexanes. The stripped product had an S. S. U. viscosity at 210° F. of about 4050. It was then heat soaked for one hour at a temperature of 100° C. Samples of the heat soaked material were removed at 15-minute intervals and tested for viscosity characteristics. This product had a sulfur content of about 11%.

Product B was prepared in another commercial batch operation under conditions approximating those used in forming Product A. The solvent-free product had an S. S. U. viscosity at 210° F. of about 2760. It was then heat soaked for two hours at 130° C., samples being removed periodically for viscosity determinations.

The relation between soaking time, temperature and percent increase in viscosity are shown in the following table:

| Product | Soaking Time, Minutes | Soaking Temp., ° C. | Increase in S. S. U. Viscosity at 210° F., Percent |
| --- | --- | --- | --- |
| A | 15 | 100 | 4 |
| A | 30 | 100 | 9 |
| A | 60 | 100 | 28 |
| B | 15 | 130 | 15 |
| B | 30 | 130 | 26 |
| B | 60 | 130 | 29 |
| B | 120 | 130 | 47 |

At a soaking temperature of about 100° C., the viscosity increase was relatively low during the first 30 minutes. At a temperature of about 130° C., however, a viscosity increase of about 15% occurred during the first 15 minutes and then increased to about 26% during the next 15 minutes. Therefore, conducting the distillation step at a temperature of about 130° C. and then continuing the heating period at this temperature for prolonged periods causes relatively rapid increases in viscosity. If the distillation is conducted rapidly and the temperature reduced to a somewhat lower level by quenching or cooling, viscosity increases are controlled within reasonable ranges.

What is claimed is:

1. In the preparation of alkyl phenol sulfides in which an alkyl phenol and sulfur chloride are reacted in the presence of a volatile organic solvent and in which the solvent is removed from the resulting product by volatilization thereof, the improvement which comprises removing said solvent at a temperature below about 130° C. during a period less than about 15 minutes.

2. In the preparation of alkyl phenol sulfides in which an alkyl phenol and a sulfur chloride are reacted in the presence of an organic solvent boiling below about 100° C., and in which the solvent is removed from the resulting product by distillation, the improvement which comprises maintaining the temperature of distillation below about 115° C., and carrying out said distillation operation in a period of less than about 15 minutes.

3. In the preparation of alkyl phenol sulfides in which an alkyl phenol containing at least one alkyl group having in the range of about 4 to 20 carbon atoms and a sulfur chloride are reacted in the presence of hexane solvent, and in which the resulting product is freed of solvent by distillation, the improvement which comprises carrying out said distillation step in a period of less than about 10 minutes while maintaining the distillation temperature below about 130° C.

4. A process as in claim 3 wherein said distillation temperature does not exceed about 115° C.

5. A process as in claim 4 wherein said alkyl phenol is tert.-octyl phenol and said sulfur chloride is sulfur dichloride.

References Cited in the file of this patent

UNITED STATES PATENTS

| | | |
|---|---|---|
| 2,139,321 | Mikeska et al. | Dec. 6, 1938 |
| 2,195,539 | Mikeska et al. | Apr. 2, 1940 |
| 2,409,687 | Rogers | Oct. 22, 1946 |
| 2,449,026 | Gilder | Sept. 7, 1948 |